United States Patent [19]
Costanza

[11] Patent Number: 5,412,409
[45] Date of Patent: May 2, 1995

[54] IMAGE REGISTRATION FOR A RASTER OUTPUT SCANNER (ROS) COLOR PRINTER

[75] Inventor: Daniel W. Costanza, Webster, N.Y.

[73] Assignee: Xerox Corporation, Stamford, Conn.

[21] Appl. No.: 55,335

[22] Filed: May 3, 1993

[51] Int. Cl.⁶ ............................................. H04W 1/21
[52] U.S. Cl. .................................................. 347/118
[58] Field of Search ................... 346/160, 108, 107 R, 346/76 L, 1.1; 355/208, 326, 327, 328

[56] References Cited

U.S. PATENT DOCUMENTS

| | | | |
|---|---|---|---|
| 4,611,901 | 9/1986 | Kohyama et al. | 355/4 |
| 4,660,059 | 4/1987 | O'Brien | 346/157 |
| 4,833,503 | 5/1989 | Snelling | 355/259 |
| 5,257,048 | 10/1993 | Genovese | 346/160 |
| 5,278,587 | 1/1994 | Strauch et al. | 346/160 |

*Primary Examiner*—Mark J. Reinhart

[57] ABSTRACT

The present invention is directed to a precise method of registering a plurality of ROS imagers, so as to form sequential registered images on a photoreceptor belt in a single pass. Pairs of belt holes are formed in the photoreceptor belt, outside the image area and outside of the scan width of the ROS imagers. A pair of light sources are incorporated into the post polygon optics of each ROS imager so as to produce a light spot at the photoreceptor surface which will periodically illuminate the holes on the belt. As the leading edge of the belt holes advances into the beams, detectors placed beneath the belt and beneath the exposure station provide signals representing the exposure level of the light source output. The detectors produce a current output representative of the exposure level. The current output is converted into page sync signals which are reproducible through each of the imaging stations to produce registration of the first scan line of each image sequence. The current outputs are also converted into error signals which correct for lateral and skew registration errors.

7 Claims, 2 Drawing Sheets

IMAGE REGISTRATION FOR A RASTER OUTPUT SCANNER (ROS) COLOR PRINTER

BACKGROUND OF THE INVENTION

The present invention relates to color printers wherein one or more Raster Output Scanners (ROSs) form color images on exposure frames of a photoreceptor belt and, more particularly, to a method and apparatus for forming the color images in registration.

Printers are known in the art wherein a Raster Output Scanner is positioned in an optical scan system so as to write an image on the surface of a moving photoreceptor belt. A modulated laser beam is swept across the photoreceptor surface after being directed against the facets of a rotating polygon. Each sweep exposes a raster line to a linear segment of a video signal image.

In a color xerographic ROS printer, a lurality of ROS units are positioned adjacent a photoreceptor belt surface and selectively energized to create successive image exposures until a series of image frames, each of a separate color image, is formed. For full color, four imagers are used, one for each of the three basic colors and a fourth for black images. Each image is developed in overlying registration with preceding images and a composite color image is transferred to an output sheet. Each image must be registered in both the photoreceptor process direction and in the direction perpendicular to the process direction (referred to as the fast scan or lateral direction). One registration technique is to form a plurality of holes in non-image areas of the belt at some predetermined distance upstream from an associated image exposure frame. The ROS beam is positioned so that each line sweep, or scan, begins and ends in non-image areas of the photoreceptor so as to scan across the belt holes as the belt advances into an exposure zone. Each ROS has an associated pair of sensors positioned beneath the belt. These sensors detect the ROS scanning beams as it is swept across the leading edge of a belt hole and provides output signals which are used for registration purposes. This type of ROS registration technique is generally disclosed in U.S. Pat. No. 5,302,973 issued on Apr. 12, 1994, and assigned to the same assignee as the present invention.

A major difficulty in registering the images in a ROS belt hole type detection system lies in the scanning nature of the ROS device; the spot which is swept across the photoreceptor moves at a very high rate (60,000 ips) which reduces the time the beam illuminates the photodetector through the belt hole. Since the photodetector typically has a width of only a few millimeters, the ROS beam is only sensed by the photodetector for a short time duration measured in microseconds. It has proven difficult to design detection circuits to achieve the required registration accuracy of 5-10 microns.

Several attempts have been made to design faster detection and amplification circuits. U.S. Pat. No. 5,321,434 issued on Jun. 14, 1994, and assigned to the same assignee as the present invention utilizes a split cell photodetector in conjunction with amplifying means. U.S. Pat. No. 5,278,587 issued on Jan. 11, 1994, and assigned to the same assignee as the present invention connects the photodetector output to a linear interpolation circuit to achieve a more precise method of identifying the leading edge of the holes. These prior art, co-pending applications are all hereby incorporated by reference.

There is still a need for a more accurate method of registering the color image in a ROS-type printing system. The present invention is directed to a registration technique which does not rely on the light from the ROS beam to be sensed by a photodetector. instead, a separate dedicated light source is provided that does not move in the fast scan direction, as is the case with the ROS beams sweeping across the photoreceptor. Two separate light sources, which are LEDs in a preferred embodiment, are located in the ROS optical system so as to form two light beams outside the scanning width of the ROS beams. The beams provide a continuous light flux along areas of the photoreceptor and "look" for the belt holes formed on the belt. When the belt holes are illuminated by the light sources, the photodetectors on the other side of the belt are illuminated and provide a continuous signal which simplifies the associated amplifier design and allows for more accurate sensing of the belt hole locations. More particularly, the present invention relates to an imaging system for forming multiple image exposures on exposure frames of a photoconductive member including:

a photoreceptor belt having a plurality of image exposure frames along its circumference, said belt having at least a first and second hole on opposite sides of the belt width and outside of the exposure frames, a plurality of ROS imagers, each ROS imager associated with the formation of one of said image exposure frames, each imager forming a plurality of projected scan lines in a fast scan direction across the belt width, said scan lines beginning and ending at points within an image exposure frame, a first and second light source opposed from one surface of the photoreceptor belt for illuminating said first and second belt holes, first and second detecting means associated with each of said imagers, said detecting means opposed from the other surface of the photoreceptor for sensing the light from said first and second light sources through said belt holes and generating signals representing said detection, and circuit means to amplify said detecting means output signals and to generate image registration correction signals.

DETAILED DESCRIPTION OF THE INVENTION

Figure 1:
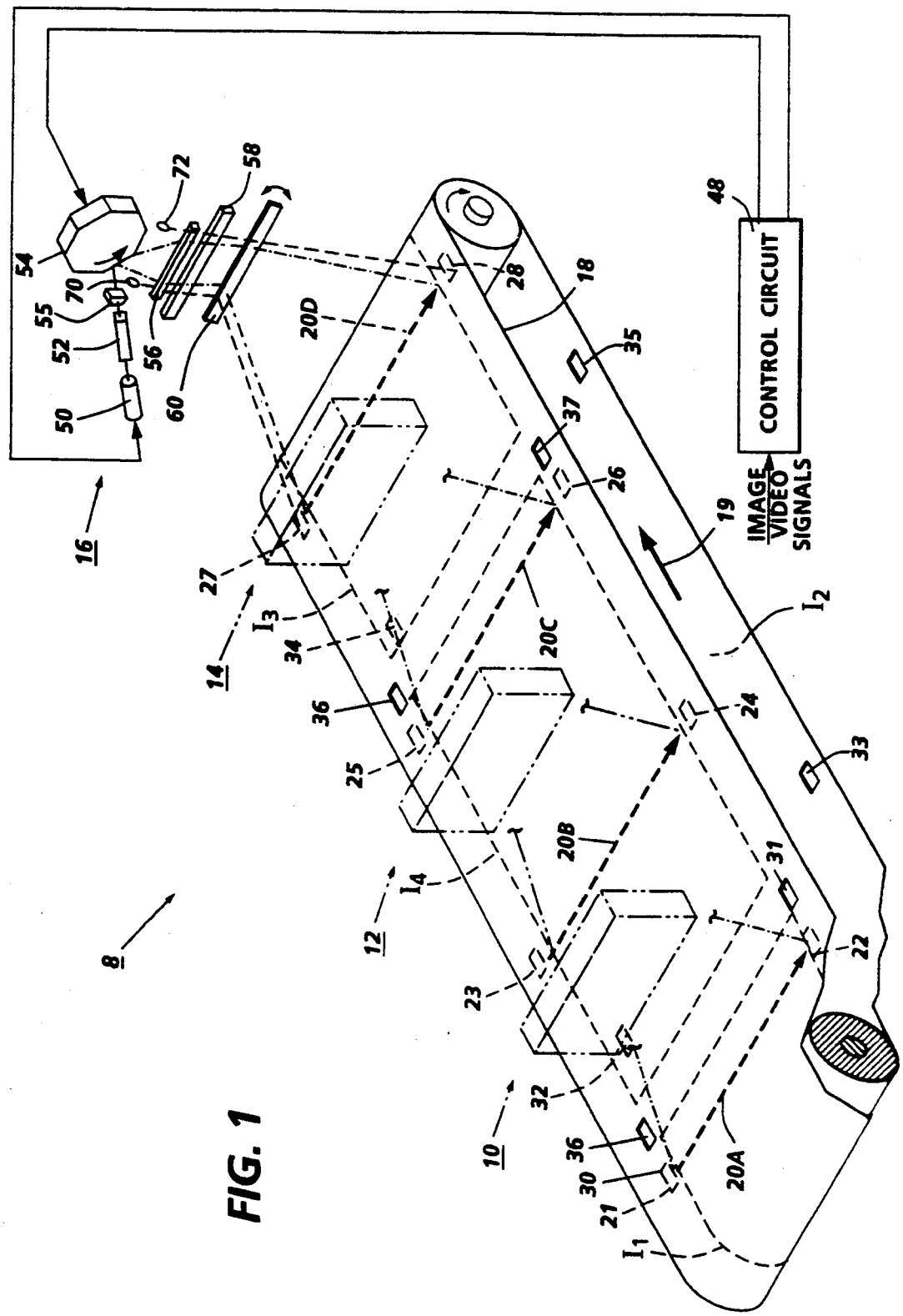
FIG. 1 shows a ROS color printer incorporating the improved hole detection and registration mechanism of the present invention.

FIG. 1 shows a single pass, ROS color printing system 8 having four ROS imagers 10, 12, 14, 16 positioned in an image forming relation with a photoreceptor belt 18, driven in the process direction, indicated by the arrow 19. ROS imager 16 is shown in detail with all the optical elements which produce the scanning beam 20D. Each of the other ROS imagers 10-14 have identical optical systems. Operation of these imagers is described in detail in, for example, co-pending application U.S. Ser. No. 07/807,927, assigned to the same assignee as the present invention and whose contents are hereby incorporated by reference. The length of the belt 18 is designed to accommodate four A4 (8½×11) pitches or exposure image areas, $I_1$–$I_4$ represented by dashed line rectangles. Image areas $I_1$–$I_4$ each comprise an image exposure frame; it is understood that other numbers of image frames may be imaged; e.g. two frames for an A3 (11×17) system. Each frame $I_1$–$I_4$ is associated with a process color image which is formed during one belt rotation. Upstream of each of the ROS imagers is a charging station (not shown) which places a predetermined electrical charge on the surface of belt 18. As each of the image exposure areas $I_1$–$I_4$ reaches a transverse start-of-scan line for each ROS imager, represented by lines 20a–20d, the area is progressively exposed on closely spaced successive transverse raster lines. Each image is exposed successively by the ROS imagers. Each ROS imager has a start-of-scan (SOS) sensor and an end-of-scan (EOS) sensor, conventional in the art. Each imager also has a pair of photodetectors positioned beneath the belt, but in alignment with the ends of the scan line. Thus, ROS imager 10 has a pair of photodetectors 21, 22, positioned outside of the scan length of scan line 20A; ROS imager 12 has detectors 23, 24, positioned outside of the scan length of scan line 20B; ROS imager 14 has detectors 25, 26, positioned outside of the scan length of scan line 20C and ROS imager 16 has detectors 27, 28, positioned outside of the scan length of scan line 20D.

Belt 18 has been formed with four sets of belt holes, each set associated with detection of the leading edge of an associated image exposure frame just downstream from the direction of belt motion (process direction). Thus, belt holes 30, 31 are formed a predetermined distance before the leading edge of image frame $I_1$; holes 32, 33 before image frame $I_2$ (not shown but on the bottom surface of the belt); holes 34, 35 before the leading edge of image frame $I_3$ and holes 36, 37 before the leading edge of image frame $I_4$.

Downstream from each ROS imager, a development station (not shown) develops the latent image formed by the preceding ROS. The developed frame is recharged by a charging station associated with the next downstream imager and the next color image is formed over the previously developed image. It is understood that each exposure frame; e.g. $I_1$, is successively exposed at each downstream ROS station, with a composite color image being formed and transferred to an output sheet at a transfer station. Details of charge, development and transfer xerographic stations in a multiple exposure single pass system are disclosed, for example, in U.S. Pat. Nos. 4,660,059, 4,833,503 and 4,611,901, whose contents are hereby incorporated by reference. The charge, development, and transfer stations are conventional in the art.

The components of ROS unit 16 are shown in detail in FIG. 1. It is understood that units 10, 12, 14aresimilar in Eonstruction. ROS unit 16, in a preferred embodiment, is a compact system which comprises a laser diode 50, which is modulated in accordance with input video image signals processed through control circuit 48. The laser diode output is directed through a beam-shaping optical system 52 which provides collimation and beam expansion of the laser output. The collimated output from system 52 is focused in the vertical axis onto the facets of rotating polygon 54 by a positive, cylindrical lens 55. Lens 55 also optically corrects for polygoninduced sagittal beam position (wobble) error. The reflected rays from polygon 54 facets are focused in the fast scan direction at the surface of belt 18 forming the scan line 20D. The beam is focused through an fΘ lens 56 to linearize the beam and reflected from movable mirror 58. Belt mirror 60 folds the scan line onto the photoreceptor surface.

Figure 2:
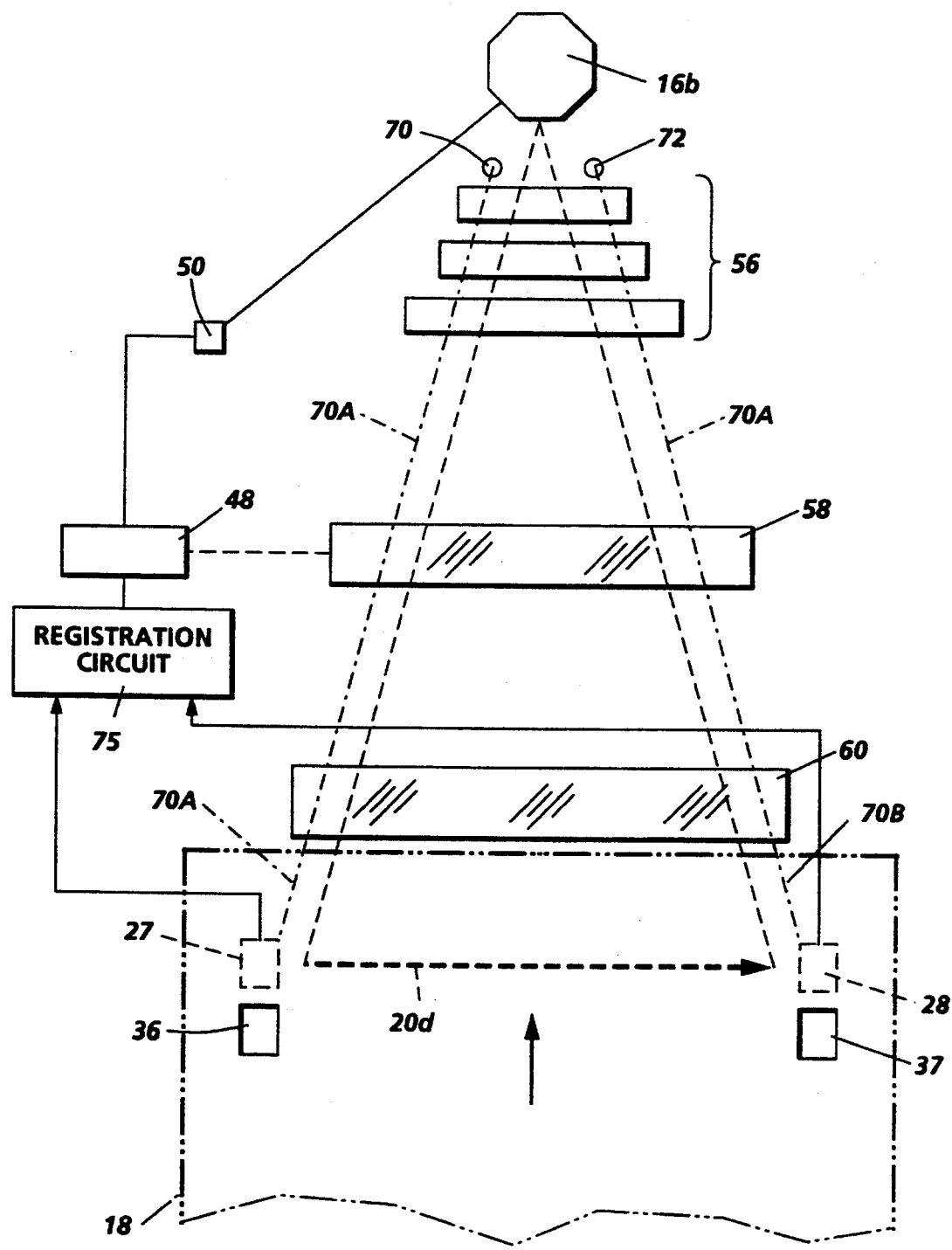
FIG. 2 shows an unfolded schematic of the ROS imager optical system of FIG. 1 showing the location of the light sources used for the belt hole detection.

In accordance with the present invention, a pair of light sources 70, 72 are located in the post polygon optical system between polygon 54 and lens 56. FIG. 2 shows a schematic of the ROS 16 optics in an unfolded configuration. Referring to FIGS. 1 and 2, the light sources generate output beams 70A, 72A, which are located in parallel paths to the ROS beam forming output scan line 20D, but outside of the scanning width. The beams will hereafter be referred to "steering" beams. The steering beams 70A, 72A illuminate the surface of the belt 18 in areas outside the scan length and aligned with the portion of the belt where holes 31–37 have been formed. It is understood that ROS units 10, 12, 14 have sets of light sources similarly positioned with respect to their associated polygons. These light sources, which are small LEDs in a preferred embodiment, are accurately positioned during initial system alignment with regard to the scanning beams of each ROS. The position of the steering beams, on either side of the scanning beam, are measured in both the lateral (fast scan) and process (slow scan) direction. The relative position of the steering beam to the scan lines 20a–20d will be unique to each beam in each ROS and are entered into machine logic contained in control circuit 48. Once the relative position is measured, all motion of the scanning beams will be followed by the steering beams.

Referring again to FIGS. 1 and 2, an operational sequence will be described to demonstrate the utility and function of the steering beams in obtaining registration of the color images formed by the ROS units. FIG. 1 shows system 8 in a position where frame $I_4$ is approaching ROS station 16. It is assumed that three color images have been previously exposed and developed on frame $I_4$ by ROS imagers 10, 12, 14. As frame $I_4$ approaches ROS imager 16, holes 36, 37 will advance into the flux from steering beam 70A, 72A, respectively. Sensors 27 and 28 are illuminated and generate output signals which are sent to a registration circuit 75. Circuit 75, as is known from the prior art referenced supra, contains amplification and conversion circuitry which will generate error signals to correct misregistration in the process and scan directions. Appropriate signals are sent to circuit 48 to correct the output of laser diode 50 for lateral and process direction registration errors and also to enable the line sync signals for the first line of image information to be formed on image frame $I_4$. Signals are sent to mirror 58 to adjust the position and/or tilt to correct for process and skew errors. The signals may also be used to move another optical component such as lens 56. These error signals thus correct for any registration error which may have occurred since the original alignment and ensure that the first line of image information is registered with the first scan line of image frame $I_4$. The full image is then written by successive scan lines from ROS imager 16 and the final image developed and the composite image transferred.

Although the invention has been shown in a single pass embodiment, it can also be practiced in a multi-pass system where a single ROS imager; e.g. in FIG. 1, ROS imager 10 only being used to form each image. Thus, the photoreceptor is charged, prior to entering the ROS 10 exposure station; the first image is formed on exposure frame I₁ and developed at a development station which can be at any point downstream from ROS imager 10, including locations adjacent the underside of the belt. The first developed image on frame I₁ is then recharged and exposed with the second image by ROS imager 10 and developed with a second color. The second and subsequent images are formed in registration with the first image by using signals generated from detection f holes 30, 31 by sensor 21, 22 detecting steering beams passing through the leading edge of holes 30, 31. This process can be repeated for two more passes to create the full color composite image.

In the preferred embodiment, light sources 70, 72 are small LEDs. These LEDs may require a plastic lens in the optical path to produce a focused spot at the belt surface to provide a sharper transition at the edge of the belt holes. The preferred location for sources 70, 72 is between the movable mirror 58 and the polygon, since, for this location, both the steering and scanning beams are moved in unison. Also, with close placement of the light sources to the polygon, errors due to the motion of the post-polygon optics (lens 56, mirrors 58 and 60) will be eliminated. These errors typically occur when thermal or mechanical loads cause a movement in these optical components, creating shifts in the positions of the scan lines. If the light sources are located upstream of these components, the steering beams will be shifted a like amount, eliminating any relative position errors.

In summary, the present invention is seen to provide a method for illuminating registration sensors through belt holes by use of a non-scanning beam which relaxes the need for high speed, high accuracy amplifiers required in the prior art systems. The ROS imagers 10–16 can be operated with a shorter scan width since the beams do not have to sweep across the opposed belt holes outside of the image areas.

While the invention has been described with reference to the structures disclosed, it is not confined to the details set forth, but is intended to cover such modifications or changes as they come within the scope of the following claims.

What is claimed is:

1. An imaging system for forming multiple image exposures on exposure frames of a photoconductive member including:
    a photoreceptor belt having a plurality of image exposure frames along its circumference, said belt having at least a first and second hole on opposite sides of the belt width and outside of the exposure frames,
    a plurality of ROS imagers, each ROS imager comprising a laser light source for cleneratinq a modulated coherent light beam output along an optical path.
    a rotatable multifaceted polygon interposed in the optical path between the laser light source and the photoreceptor belt for scanning light beams directed onto the facets of said polygon in a fast scan direction across the photoreceptor belt.
    a pre-polygon Optical system for focusing said modulated laser light output beams at the polygon facets.
    a post polygon optical system to focus reflected light beams from said polygon in said fast scan direction
    a first and second light source opposed from one surface of the photoreceptor belt for illuminating said first and second belt holes, said first and second light source located between the polygon and the post polygon optical system
    first and second detecting means associated with each of said imagers, said detecting means opposed from the other surface of the photoreceptor for sensing the light from said first and second light sources through said belt holes and generating signals representing said detection, and
    circuit means to amplify said detecting means output signals and to generate image registration correction signals.

2. The imaging system of claim 1 wherein a plurality of ROS imagers form a plurality of image exposures in a single pass of the photoreceptor belt.

3. The imaging system of claim 1 wherein said light sources include means for focusing the light source outputs as spots on the photoreceptor surface.

4. The imaging system of claim 1 wherein said light sources create steering beams which are directed along a path parallel to and outside of the image scan beams defining the beginning and end points of the scan line.

5. The imaging system of claim 1 wherein said post-polygon optical system including at least one movable optical component, said image registration signals being used to adjust the position of said movable member and wherein said first and second light sources are located between the polygon and said movable optical component.

6. A method for forming registered multiple image exposures on a photoreceptor belt moving in a process direction including the steps of:
    forming at least a first and second hole in the belt in non-image areas at opposite sides of the belt width,
    positioning at least one Raster Output Scanner (ROS) imager so as to form said registered image exposures, said ROS imager forming a plurality of scan lines in a fast scan direction across the width of said belt by reflecting modulated beams from the multifaceted surface of a rotating polygon, and passing said reflected beams through a post polygon optical system,
    positioning a pair of light sources between the polygon and the post polygon optical system, said light sources generating output steering beams which are adjacent to and outside the path of the scanning beams,
    moving the belt until the steering beams are detected through said holes by photodetecting means positioned beneath said ROS imager, and
    adjusting the position of said scan lines in response to registration error signals generated by said photodetecting means.

7. A color printer for forming registered color images on the surface of a photoconductive member, said member having at least a first and second hole on opposite sides of the member and outside an exposure area,
    a plurality of ROS systems, each ROS system comprising a source of coherent modulated output beams,
    a multifaceted deflector positioned along an optical path between said source and said member,
    first optical means located between said source and said deflector for collimating and focusing said modulated output beams onto said deflector,
    second optical means positioned between said deflector and said member for shaping and focusing the reflected beams along the scan lines,
    a first and second light source between the deflector and the second optical means, said first and second light source positioned so as to illuminate said belt holes, first and second detecting means associated with each of said ROS systems said detecting means opposed from the opposite surface of the photoconductive member for sensing the light from said first and second light source through said photoconductor member holes and generating signals representing said detection and circuit means to amplify said detecting means output signals and for generating image registration correction signals.

* * * * *